United States Patent [19]

Krug et al.

[11] 4,414,100
[45] Nov. 8, 1983

[54] FLUIDIZED CATALYTIC CRACKING

[75] Inventors: Russell R. Krug, San Rafael; Robert P. Hohmann, Oakland, both of Calif.

[73] Assignee: Chevron Research Company, San Francisco, Calif.

[21] Appl. No.: 335,458

[22] Filed: Dec. 29, 1981

[51] Int. Cl.³ .................................................. C10G 11/18
[52] U.S. Cl. .................................. 208/153; 202/164; 422/144; 422/145
[58] Field of Search ............... 208/113, 153, 161, 164, 208/157; 422/145, 147, 144

[56] References Cited

U.S. PATENT DOCUMENTS

| | | | |
|---|---|---|---|
| 2,579,678 | 6/1947 | Kuhn | 208/164 |
| 3,123,547 | 3/1964 | Palmer et al. | 422/145 X |
| 3,607,126 | 9/1971 | Pfeiffer | 208/153 X |
| 3,661,799 | 5/1972 | Cartmell | 208/153 X |
| 3,661,800 | 5/1972 | Pfeiffer et al. | 208/164 X |
| 3,690,841 | 9/1972 | Bunn, Jr. et al. | 422/145 X |
| 3,826,624 | 7/1974 | Jones et al. | 422/145 X |
| 4,050,902 | 9/1977 | Pulak | 208/164 X |
| 4,118,337 | 10/1978 | Gross et al. | 208/164 X |
| 4,246,231 | 1/1981 | Figler et al. | 422/147 |
| 4,310,411 | 1/1982 | Wilkening | 208/164 X |

Primary Examiner—Delbert E. Gantz
Assistant Examiner—Glenn A. Caldarola
Attorney, Agent, or Firm—Burns, Doane, Swecker & Mathis

[57] ABSTRACT

The present invention relates generally to fluidized catalytic cracking. More particularly, the present invention relates to a baffle arrangement that improves separation of gaseous hydrocarbon reaction products from catalyst within the reactor vessel of a fluidized catalytic cracker unit. The catalytic reactor vessel includes an outer generally cylindrical shell having a stripping zone arranged at the lower end of the vessel. An inlet riser conduit forming a primary reaction zone extends generally external to and generally parallel with the shell to a location near the top of the vessel. The upper end of the riser conduit then turns through 180°, preferably through two right angle turns of 90° each, so that the riser conduit enters the vessel either on a horizontal run into the side of the vessel and then turns downwardly, or on a downward run through the top of vessel, into the center of the vessel to form an outlet, discharging downwardly the mixture of hydrocarbon and catalyst. The mixture is directed against a catalyst disengaging baffle whose surface is at an obtuse angle to the axis of the riser discharge conduit. The resulting angle of deflection of the flowing mixture is from 10° to 30°, preferably 20°. According to a preferred form of the present invention, a conical catalyst disengaging baffle is arranged with its apex directed toward and the axis concentric with and below the discharge outlet. The conical baffle is also above the stripping zone, so that the mixture is deflected outwardly from the outlet toward the wall of the vessel.

22 Claims, 13 Drawing Figures

FLUIDIZED CATALYTIC CRACKING

BACKGROUND OF THE INVENTION

1. Field of the Invention

The present invention relates generally to fluidized catalytic cracking. More particularly, the present invention relates to apparatus and processes for improved separation of converted hydrocarbon oil fractions from catalyst within a fluidized catalytic cracking system.

2. Summary of the Prior Art

Hydrocarbon feedstocks such as petroleum oil fractions may be advantageously converted to lower boiling, more valuable hydrocarbon products such as gasoline by means of fluidized ctalytic cracking reactions. see, for example, U.S. Pat. Nos. 3,243,265, 3,123,547; and 3,841,843. The disclosure of copending application Ser. No. 238,380 filed Feb. 26, 1981, assigned to the assignee of the present application, is incorporated herein by this reference thereto.

In a known catalytic cracker unit an input feed of a mixture of hydrocarbon oil and catalyst is reacted in a riser conduit. The riser is associated with a reactor vessel, either running through the vessel or external to the vessel. In the latter case, the top of the riser generally includes a U-turn to first enter a side wall of the reactor vessel and then discharge downwardly into the reactor vessel. Spent catalyst from this reaction is allowed to fall through the vessel which contains a stripping section. Steam is generally introduced into the lower end of the vessel to aid in displacing hydrocarbons from the catalyst. Gaseous oil conversion products are conveyed upwardly and are separated from entrained catalyst in cyclone separators arranged at the upper portion of the vessel. Spent catalyst is removed from a lower portion of the vessel and is conveyed to a regenerator.

It has been found that the known designs tend to discharge large quantities of catalyst, particularly in the form of fines, with the oil conversion products conveyed to the upper portion of the reactor vessel. Further, the baffle arrangements of some of the prior art units have tended to cause slumped areas of catalyst within the reactor vessel. The slumped catalyst areas may raise the temperature of the unit and interfere with proper catalyst circulation thereby lowering the efficiency of the unit. Also, catalyst/steam contact is inhibited within the slumped catalyst areas so that a lesser amount of oil conversion products is removed from the catalyst.

Therefore, the search has continued for improved fluidized catalytic cracking apparatus and processes which are more effective in producing converted hydrocarbon oil products while avoiding the problems of the prior art.

SUMMARY OF THE INVENTION

Accordingly, it is an object of the present invention to provide an improved apparatus and process for fluidized catalytic cracking using an external riser discharging the mixture of catalyst and hydrocarbons into a reaction and separation vessel that promote efficiency of separation and minimize losses of catalyst.

A further object of the present invention is to provide an improved cracking system that possesses a favorable residence time distribution for catalyst passing through the system. Still further, an object of the present invention is to provide an improved apparatus and process which limit areas of slumped or stagnant catalyst within the reaction vessel such that steam/catalyst contact is sufficiently effective throughout the entire reactor vessel. In addition, by preventing slumping of the catalyst the operating temperatures withi the unit can be reduced, leading to more efficient and more reliable operation.

In one aspect of the present invention, these objects and other are achieved by separating reaction products from catalyst in fluidized catalytic reaction system involving.

(a) conveying an input feed of a catalytic reaction mixture upwardly within a riser conduit zone arranged generally parallel with and external to a reactor vessel, (b) directing flow from the riser conduit zone into a central portion of the reactor vessel through a U-turn to discharge the catalytic reaction mixture from the conduit zone into the vessel and downwardly through an outlet zone, preferably annular in form, adjacent to the discharge end of the riser conduit zone;

(c) deflecting the downwardly moving catalytic reaction mixture outwardly from the riser conduit zone discharge end toward the outer wall of the vessel to promote early disengagement of catalyst from reaction products;

(d) directing disengaged catalyst to a stripping zone arranged in a lower portion of the vessel; and (e) recovering reaction products separated from catalyst in an upper portion of the vessel.

In another aspect of the present invention, a fluidized catalytic cacker unit has a reactor vessel with an outer generally cylindrical shell with a stripping zone arranged at the lower end of the vessel. An inlet riser conduit extends generally parallel with the vessel and enters the upper end of the vessel through a side wall or the top at a location spaced downwardly from the top of the vessel. A mixture of hydrocarbons and catalyst is conveyed upwardly in the riser conduit, wherein, most of the cracking of hydroarbons takes place. The discharge end of the riser conduit is arranged generally in the center of the reactor vessel so that the lower end discharges the mixture of catalyst and reacted hydrocarbons axially and downwardly inside the vessel. A main improvement of this embodiment over the prior art is the addition of a catalyst disengaging baffle for deflecting the mixture discharged from the center of the reactor vessel toward the wall of the vessel. This baffle is below the outlet of the riser conduit above the stripping zone and preferably coaxial with the discharge end of the riser outlet and the reactor vessel.

In a preferred aspect of the present invention, a conical baffle is arranged at an angle of between about 10° to 30°, most preferably at an angle of 20°, with respect to the reactor vessel axis, in order to prevent a buildup of catalyst along the conical sidewall of the baffle and to promote early disengagement of catalyst from the hydrocarbon vapors. Further in a preferred aspect, the radial distance from the center of the riser discharge outlet conduit to the bottom edge of the conical catalyst disengaging baffle is greater than 1 and less than 10 times (preferably 2 to 3 times) the radius of the riser discharge outlet. In one form, the apex of the conical catalyst disengaging baffle may extend upwardly into the riser discharge outlet to assure that the annular flow is well distributed around the circumference of the conical baffle.

Desirably, but not necessarily, the riser conduit may include turning means, stationary turning vanes or T-junction having a blind pocket, which are installed in the turn of the upwardly directed conduit into the horizontal portion, and which may similarly form the horizontally to downwardly directed portion. Such turning means promote catalyst-hydrocarbon mixing and contat as well as a fairly uniform distribution of catalyst in the mixture leaving the riser outlet.

Still further, in another preferred aspect of the present invention, an annular catalyst disengaging wall baffle is arranged on the inside of the reactor vessel shell. Preferably, the wall baffle is arranged at an angle of about 10° 30', most preferably 20°, with respect to the wall of the shell. The wall baffle may be formed as a separated member or may be an appropriately tapered shell wall portion.

In another preferred aspect, the conical baffle and particularly in combination with the wall baffle are arranged within the shell such that a partial cyclone separation is promoted. In order to prevent catalyst buildup between the baffles, the cross-sectional area of the opening formed between a lower end of the conical baffle and the wall baffle is approximately the same (i.e., ±50%) the cross-sectional area of any portion of the downstream stripping zone. The cross-sectional area of the stripping zone is defined as the entire cross-sectional area (excluding baffling) through which spent or resulting catalyst and steam flow countercurrently.

In a preferred aspect of operating a fluidized catalytic cracker unit according to the present invention, an input feed of a mixture of hydrocarbons and catalyst is conveyed upwardly within a riser. The resulting hydrocarbon vapor and catalyst mixture is discharged downwardly into the central portion of the reactor vessel. The mixture is then deflected outwardly and downwardly at an obtuse angle to the axis of the central discharge end of the riser conduit by a catalyst disengaging baffle (which promotes early partial cyclone action) arranged in the center of the reactor vessel and below the riser discharge end. The mixture, now mostly catalyst, may then again be deflected by a catalyst disengaging wall baffle, which further promotes partial cyclone separation. The resulting catalyst is then permitted to fall by gravity and inertia into a stripping zone arranged at the lower end of the vessel where additional hydrocarbon is removed from the catalyst by rising steam.

Other objects and aspects of the present invention will become apparent to one skilled in the art from the following:

BRIEF DESCRIPTION OF THE DRAWINGS

Preferred embodiments of the present invention will be described in greater detail with reference to the accompanying drawings wherein like members bear like reference numerals and letters and wherein:

FIG. 3 also includes a curve showing test results of a comparison of catalyst loss versus circulation without the baffle of the present invention.

DETAILED DESCRIPTION OF THE PREFERRED EMBODIMENTS

Figures 1, 2, 3:
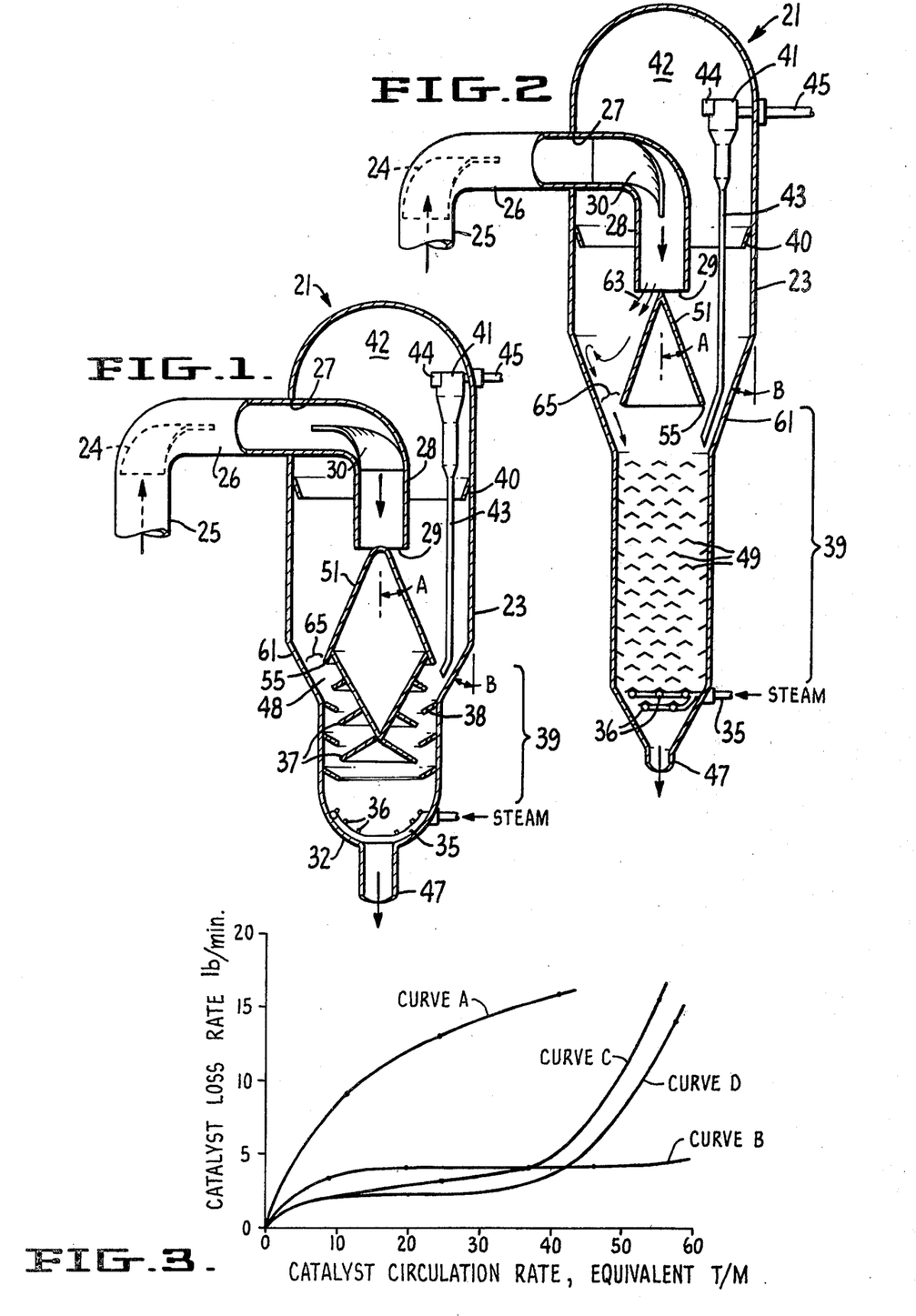
FIG. 1 is a schematic, article cross-sectional elevation view of a reactor vessel having an external riser for a fluidized catalytic cracking unit according to a first embodiment of the present invention.
FIG. 2 is a schematic, partial cross-sectional elevation view of a reactor vessel having an external riser for a fluidized catalytic cracking unit according to a second embodiment of the present invention.
FIG. 3 is a graph of catalyst loss rate (catalyst carryover exiting from pilot test facilities with the equivalent of the hydrocarbon vapor) versus different catalyst circulation rates, as determined by model studies of the embodiments of FIGS. 1 and 2; which included catalyst disengaging baffle arrangements.

With reference to FIG. 1, a reactor vessel 21 of a known fluidized catalytic cracking system or unit includes an outer generally cylindrical shell 23 for containing catalytic reaction mixture material and steam therein. A reactor riser conduit 25 is arranged generally external to the vessel 21. The riser conduit 25 extends upwardly and closely parallel to a location near the top of the vessel. A generally right angle turn section 26 in riser conduit 25 passes through opening 27 in sidewall 23. This first turn may be accomplished using a sharp 90° turn. To keep distribution of catalyst somewhat uniform from conduit 25 to conduit 28, stationary turning means, such as internal vanes 24 and 30 may be used, as in FIGS. 1 and 2. As shown in the drawings, riser conduit 26, after entering the vessel through sidewall opening 27 includes a downwardly turned section 28 to discharge the catalytic reaction mixture from opening 29 downwardly in the center of reactor vessel 21. The second turn, from conduit 26 to downward flowing conduit 28, may have turning means, such as vanes 30 within the riser conduit to assure fairly uniform distribution of catalyst in the mixture as it exits conduit 28. Alternatively, a fluid cushion arrangement may be used, as in FIG. 4, or the turning vanes omitted, as in FIG. 5, in the turn from vertical conduit 25 to conduit section 26. Alternatively, section 28 of the riser conduit may enter vessel 21 through opening 32 as shown in FIG. 5 using either turning vanes 24, pocket 22 or no turning means.

The riser conduit 25 provides a generally upwardly extending passageway for the flow of a mixture of catalyst and reactant, such as hydrocarbons. Steam may also be added to the riser conduit 25 in a conventional manner (not shown) in order to aid the flow of the hydrocarbons/catalyst mixture therethrough.

The hydrocarbon vapor/catalyst mixture discharged at the center of the vessel 21 from the riser conduit 28, falls downwardly primarily by inertia and gravity from the outlet 29. The mixture flows into a stripping zone 39 arranged at the lower, reduced diameter end of the vessel 21. Stripping zone 39 includes a plurality of rows of baffles such as annular rings 38 and discs 37 which promote good catalyst/steam contacting. The baffles may be of any known type arranged within the stripping zone 39.

Hydrocarbons associated with the catalyst particles are separated therefrom by a flow of stripping steam introduced into the lower portion of the vessel 21 through a suitable inlet manifold 35 feeding a plurality of injection nozzles 36 under the lowest row of baffles. The gaseous hydrocarbon conversion products stripped from the catalyst are convected to the space 42 at the top of vessel 21. Catalyst particles entrained with the upward flow of steam and hydrocarbon products are separated in at least one cyclone separator 41 arranged in an upper portion of reactor vessel 21. Particles of catalyst, including fines, are delivered to the lower end of reactor vessel 21 through outlet lines or diplegs, 43 from cyclone separators 41. The hydrocarbon products and unseparated catalyst particles are conveyed for any suitable further processing through an outlet line 45.

After hydrocarbons are removed in stripping zone 39, the spent catalyst is removed in stripping zone 39, the spent catalyst is removed through an outlet line 47 at the bottom of vessel 21 and is delivered to a regenerator (not shown). Catalyst from the regenerator is eventually remixed with oil and conveyed to the inlet of riser reactor conduit 25. The system thus far described apart from reference 50 copending application Ser. No. 238,380 is conventional in fluidized catalytic cracking of hydrocarbon fluids. However, FIG. 1 shown a first embodiment of the present invention. Specifically, it includes additionally a conical catalyst disengaging baffle 51 for deflecting the hydrocarbon vapor/catalyst mixture discharged from the central outlet 29 of riser reactor 28 toward the outer wall of the vessel 21. The baffle 51 is arranged generally coaxially with discharge section 28 of riser conduit 25.

Figure 7:
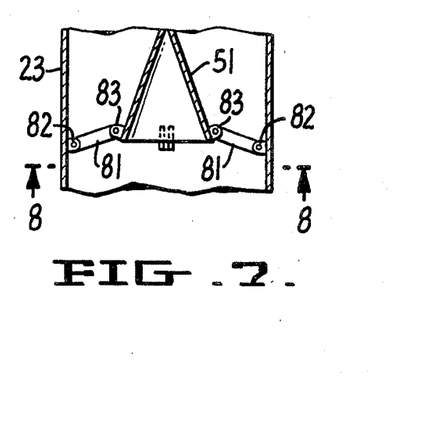
FIG. 7 is a detailed elevation view of a suitable mounting arrangement for centrally positioning the catalyst disengaging baffle in the reactor vessel.
Figure 8:
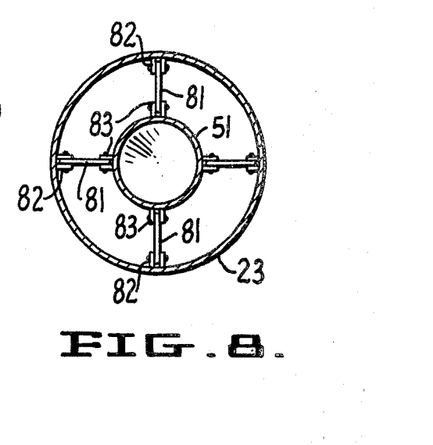
FIG. 8 is a cross-section plan view of the baffle mounting means taken in the direction of arrows 8—8 in FIG. 7.

For the sake of clearly illustrating the operation of the present invention, the mounting of conical baffle 51 is not shown in FIGS. 1 and 2. FIG. 7 and 8 illustrate a preferred arrangement for such central mounting. As there shown a plurality, say 4, clips 81 are radially spaced around ractor side-wall 23. Such clips are hinged as at 82 and 83 to form thermal expansion joints.

The conical surface of baffle 51 extends at an angle relative to section 28 of riser conduit 25 so that the baffle deflects the mixture from the discharge outlet 29 toward shell 23 of reactor vessel 21. The top of the conical baffle 41 is spaced just below the outlet 29 to avoid a narrowing of the cross-sectional area of the outlet and to ensure that conical baffle 51 is effective to promote early disengagement of catalyst from the mixture discharged from the outlet 29. The conical surface of baffle 51 may be arranged slightly convex, as in FIG. 1, purely conical as in FIGS. 2, 4, and 5, or slightly concave as cone 151 in FIG. 6 toward the upper end of vessel 21.

The baffle 51 is arranged to deflect the catalyst particles such that the particles of the mixture are subjected to a partial cyclone separation to promote early disengagement of catalyst from the reaction mixture.

The angle A formed between the baffle 51 and vertical is preferably between about 10° and 30°, and most preferably about 20°. The preferred angle of 20° for the baffle 51 is selected such that catalyst slumping (i.e., accumulation of deaerated catalyst along baffle 51) is prevented. Further, the angle of 20° is roughly equivalent to the "angle of internal friction" of a typical fluid catalytic cracking catalyst. The angle and length of the baffle is arranged so that the cross-sectional area, as indicated by bracket 65, for flow of the mixture, now mostly catalyst, within the shell is not substantially reduced, relative to the cross-sectional area for flow in stripping section 39. The cross sectional area of the stripping zone is defined as the entire area of stripping section 39 (without baffling, e.g. baffles 37 and 38 in FIG. 1 or baffles 49 in FIG. 2.)

The length of the conical catalyst disengaging baffle 51 is preferably determined by maintaining the ratio of, (a) the diameter of the bottom edge 55 of catalyst disengaging baffle 51 to (b) the diameter of opening 29 within a predetermined range. In the preferred embodiment, the ratio of these diameters is greater than one and less than ten, most preferably two to three. By maintaining the ratio of these diameters and the preferred angle of inclination of the baffle 51, the space for disengaging the catalyst from the vapors is defined; desirably the catalyst is disengaged from the hydrocarbon vapors as soon as possible and flows into the lower section 39 of vessel 21 wherein the higher steam concentration promotes further separation of hydrocarbons from catalyst. Coke formation may increase if resulting or spent catalyst is not efficiently contacted by steam.

It should be noted that in order for the baffle arrangement according to the present invention to operate in a preferred manner, the level of the fluidized dense portion of the catalyst in stripper zone 39 within vessel 21 should be maintained at a level no higher than the lower end 55 of baffle 51. This level is kept high enough to provide sufficient head to maintain adequate catalyst circulation rates. If the catalyst bed rises above the conical baffle lower edge 55, the amount of entrained catalyst delivered to the cyclones 41 increases rapidly, as shown in said copending application. A higher catalyst bed level would interfere with the desired deflection, turning, and contacting the particles with steam. Accordingly, in order to realize the full advantages of the present invention the catalyst bed is maintained at or below the lower end 55 of the conical baffle 51, but high enough to maintain adequate catalyst circulation rates.

As also disclosed in that application, modeling studies indicate the criticality of the elevation of the dense catalyst phase. Catalyst carryover to the cyclones markedly increases when such elevations exceed the elevation of the lower end 55 of baffle 51. Modeling studies have also shown the build-up of slumped, non-aerated catalyst when the dense phase elevation exceeds that of the lower end 55 of baffle 51. Commercial plant tests demonstrated that stripping efficiency decreased and catalyst circulation stability decreased when the elevation of dense catalyst phase exceeded the lower end 55 of baffle 51.

Conical baffle 51 alone is effective to reduce the amount of catalyst delivered to the cyclones and to aid in separating hydrocarbon vapor products from the catalyst. However, the objects of the present invention may be further enhanced by employing additional baffles higher up in the reactor such as annular baffle 40.

With reference to FIG. 2, another aspect of a stripper baffle arangement according to the present invention includes a catalyst disengaging wall baffle 61 for deflecting the catalyst mixture (now mostly catalyst), and promoting the cyclone separation of catalyst from the vapor or gases. The wall baffle 61 is arranged as an inside wall of the shell 23 such that the cross-sectional area 65 for catalyst flow between baffle 61 and the end 55 of catalyst disengaging baffle 51 is approximately the same as the cross-sectional area for flow of catalyst in lower stripping section 39. Wall baffle 61 is angled inwardly from the location at which it is attached to the vessel wall 23. The lower end of the wall baffle 61 preferably connects with the top of the stripping zone 39. This connection presents a smooth transition for particles flowing generally downwardly within vessel 21 toward stripping zone 39.

Wall baffle 61 nmay be arranged as a separate baffle member (FIG. 2) or may be formed as a portion of the vessel wall which is appropriately tapered (FIG. 1). The angle B of wall baffle 61 with respect to the wall of the shell 23 is preferably about 10° to 30°, and most preferably 20°. This angle B is again selected to prevent catalyst slumping along the wall baffle 61 and to ensure flow of the separated catalyst downwardly to stripping zone 39.

The effect of the angle of the catalyst disengaging baffle of this invention, with respect to vertical is also disclosed in our said copending application. Modeling studies with various angles for B show catalyst going to the dilute phase (in space 42) and to the cyclones 41 is minimal when the angle is 20°. The capacity of the vessel to circulate catalyst (i.e., before the catalyst carryover through the cyclones becomes excessive) is increased at the lower angles from vertical of the catalyst disengaging baffle. These modeling studies were made using a vessel like that shown in FIG. 2.

Conical baffle 51 and wall baffle 61 are arranged within shell 23 such that the baffles in concert with the discharge outlet 29 form complementary conical surfaces which form a partial cyclone separating zone between the baffles. In other words, as indicated by arrows 63 in FIG. 2 the mixture is discharged downwardly from the outlet 29, deflected outwardly by conical baffle 51 and further deflected by walk baffle 61 to form a partial cyclone circulation pattern between the two baffles. Due to the steep angle of the two baffles, particles continue to move downwardly toward stripping section 39 after separation from the hydrocarbon vapors. This partial cyclone action improves the efficiency of catalyst separation from hydrocarbon vapors within vessel 21.

The mixture deflected from the conical baffle 51 impinges against wall baffle 61 where the vapor portion of the mixture is deflected into a continuing cyclone action and the catalyst portion of said mixture tends to concentrate along the wall baffle. Most of such catalyst will be deflected downwardly but some will rise upwardly, along the wall baffle due to inertia of the flowing catalyst, dependent upon its mass and velocity, until such inertia effect is overcome by gravity so as to cause the accumulated catalyst to slide generally downwardly along the wall baffle and pass into the lower stripping zone. The size of the opening 29 is selected to give sufficient catalyst velocity to efficiently travel down baffle 51 to stripping zone 39, but insufficient velocity and inertia to travel up baffle 61 to the dilute phase 42, thereby effecting separation of catalyst from hydrocarbon vapors in this zone.

In order to allow for downward flow of separated catalyst between the baffles, the cross-sectional area of the annular opening 65 formed between the lower end 55 of conical baffle 51 and the wall baffle 61 is preferably approximately the same as the cross-sectional area (within ±50%) of any lower portion of main stripping zone 39. As the catalyst flows downwardly, the dense phase of catalyst should not build up above the lower end 55 of concial baffle 51.

It should be noted that concial baffle lower end 55 defines the separation between the hydrocarbon-rich area above this level and the steam-rich area below conical baffle 51. Most of the catalyst is separated from the hydrocarbon products within the partial cyclone zone created between baffles 51 and 61. The separated hydrocarbon vapors with a smaller quantity of steam are convected upwardly to the inlet ports 44 of cyclone separators 41 at the top of vessel 21. The area below the lower end 55 of conical baffle 51 is rich in steam since the steam inlet manifold 35 is arranged near the lower end of the vessel and a lesser quantity of hydrocarbon products remain with the catalyst after sliding down baffle 51. These remaining hydrocarbon products are substantially removed by the stripping steam prior to discharging the catalyst through the outlet 47 for delivery to the regenerator.

Preferably the ends of outlet lines, or "dip legs", 43 for returning catalyst carried overhead with the vapors from cyclones 41 terminate below the lower end 55 of the catalyst disengaging baffle 51 and above the baffling internals within stripping section 39. It is preferred to discharge catalyst from the cyclones into a catalyst downflow region to minimize reentrainment of the catalyst fines by the vertically rising vapors. Ample space is left in this region to prevent blockage of downward catalyst flow.

With reference to both configurations of FIGS. 1 and 2, cross-sectional area 65, between the predominantly steam phase and the predominantly hydrocarbon phase is as high as possible in vessel 21 provided that it is not so high as to interfer with the action of cyclones 41. Raising the elevation of area 65 has three desirable effects: first, stripper residence time is increased which increases stripping efficiency; second, dilute phase residence time is decreased which minimizes undesirable secondary cracking reactions; and, third, maximum achievable hydrostatic head of catalyst dense phase is increased which increases the maximum achievable rate at which catalyst can be circulated through the entire fluidized catalytic cracker unit (in plants for which such pressure affects circulation rates).

With reference to FIG. 1, a ring baffle 40 may be located above catalyst disengaging conical baffle 51, preferably high up in vapor space 42. A baffle such as 40 further assists in decreasing catalyst particle carry-over with the hydrocarbon vapor phase. This baffle should be at a steep angle, 10° to 30°, most preferably 20°, from vertical. The length of baffle 40 should be short enough so that space is available to accommodate dip legs 43.

At any one place in zone 48, as shown in the arrangement of FIG. 1, sufficient open cross-sectional area for catalyst flow must be maintained of approximately the same, but not necessarily equal to the cross-sectional area for catalyst flow in the conventional stripping zone 39. In the arrangement of FIG. 2, catalyst disengaging wall baffle 61 is also a portion of the shell wall 23, as in the embodiment of FIG. 1. As indicated in FIG. 2, the preferred angle B is also the same for baffle 61 as in the arrangement of FIG. 1.

In both of the embodiments of FIGS. 1 and 2, the steam rich phase, stripping zone, extends from the bottom edge 55 of baffle 51, designated as area 65, to steam jets 36. The "disc and donut" baffles 37 and 38, respectively, in FIG. 1 are arranged so as to allow for discharge from dip legs 43 below bottom edge 55.

Figure 4:
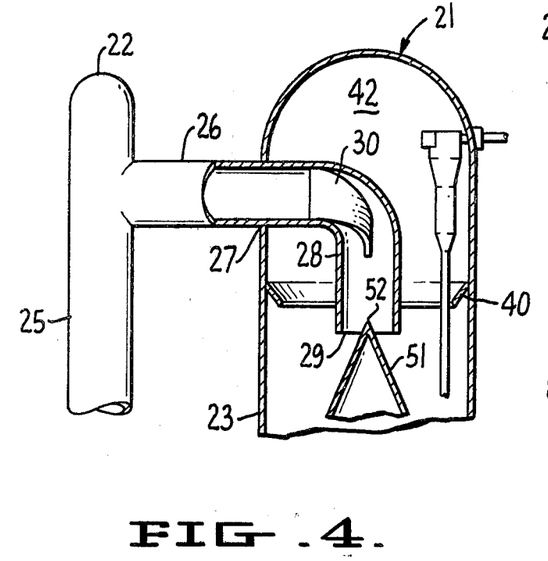
FIG. 4 is a schematic, partial cross-sectional elevation view of a further embodiment of the upper portion of a fluidized catalytic cracking unit hving an external riser pipe with a fluid cushion in the form of a T-junction with a blind pocked in one leg to allow turning of the rising catalyst-hydrocarbon mixture without erosion of the riser pipe and a cartalyst disengaging cone extending into the discharge outlet, in accordance with the present invention.
Figure 5:
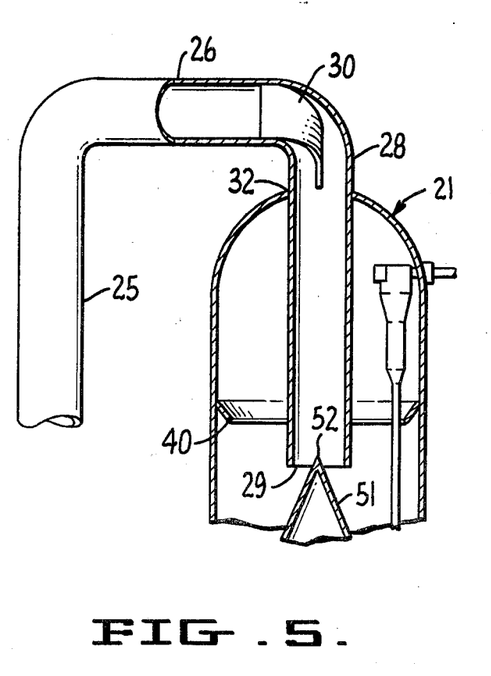
FIG. 5 is a schematic, partial cross-sectional elevation view of the upper end of fluidized catalytic cracking unit having the external riser pipe entering through the top of the reactor vessel and an auxliary baffle high in the hydrocarbon convection zone.

Referring now to FIG. 4, this figure illustrates an alternative arrangement for assisting the turning of the catalyst-hydrocarbon flow in vertical riser leg 25 to riser horizontal section 26. A T-section 22, forms a pocket of non-moving catalyst, acting as a cushion, for dissipation of the kinetic energy of the upflow stream. Pocket 22 prevents erosion of the steel pipe walls of sections 25 and 26 while assisting in turning the stream through 90°.

Figure 6:
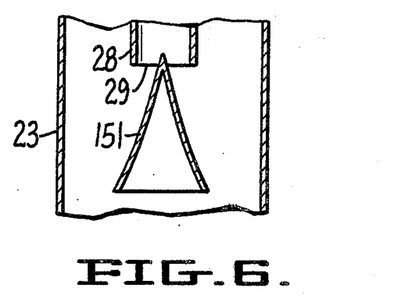
FIG. 6 is a partial cross-sectional elevation view of an alternate embodiment of the invention using a catalyst disengaging baffle formed as a concave cone member.

There are various modifications of apparatus that can also be used to perform the method of the present invention. For example, in the arrangement of FIG. 5 the riser pipe may be formed to enter through opening 32 in the top of vessel 21. Further, as shown in both FIGS. 4 and 5, apex 52 of conical baffle 51 may extend slightly up into discharge outlet 29. Also as shown in FIG. 6, a concave form of conical baffle 151 may be used to assist in creating cyclonic action of the catalyst-hydrocarbon mixture to initiate catalyst separation from the mixture.

Figure 9:
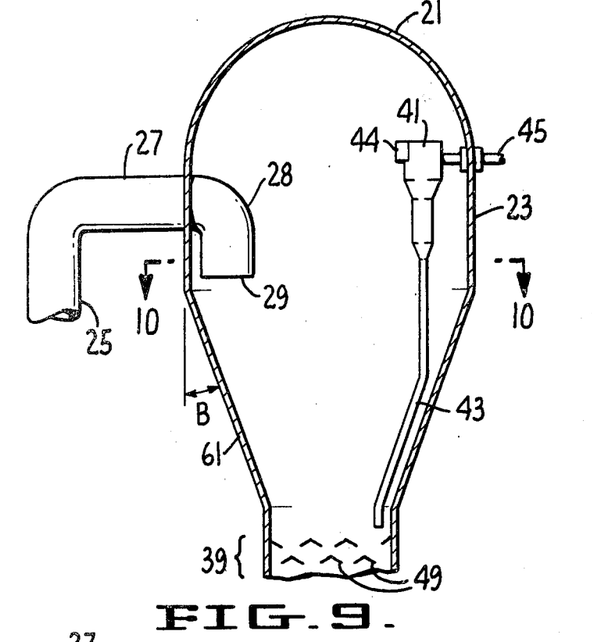
FIG. 9 is a schematic, partial cross-sectional elevation view of another embodiment of the present invention wherein discharge from the external riser pipe terminates at one side of a reactor vessel against a conical sidewall of the vessel.
Figure 10:
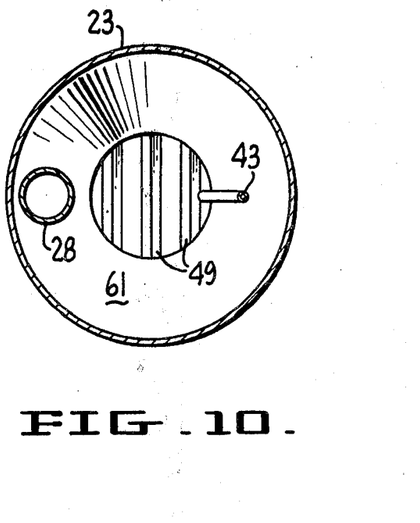
FIG. 10 is a partial cross-sectional plan view taken in the direction of arrows 10—10 in FIG. 9.

In the preferred method and apparatus embodiments of the present invention, riser exit 29 and conical baffle 51 are radially centered in vessel 21. However, the method of the present invention may be practiced with other apparatus embodiments. FIGS. 9 to 13 illustrate such alternate forms of apparatus. As shown in both FIGS. 9 and 11, riser discharge 29 may be positioned off center from the longitudinal axis of vessel 21. In the arrangement of FIGS. 9 and 10, the conical side wall 61 is 10° to 30° and preferrably 20° to the vertical. In this way the hydrocarbon-catalyst mixture is dispersed by conical surface 61 which is at an obtuse angle relative to the direction of mixture flow.

Figure 11:
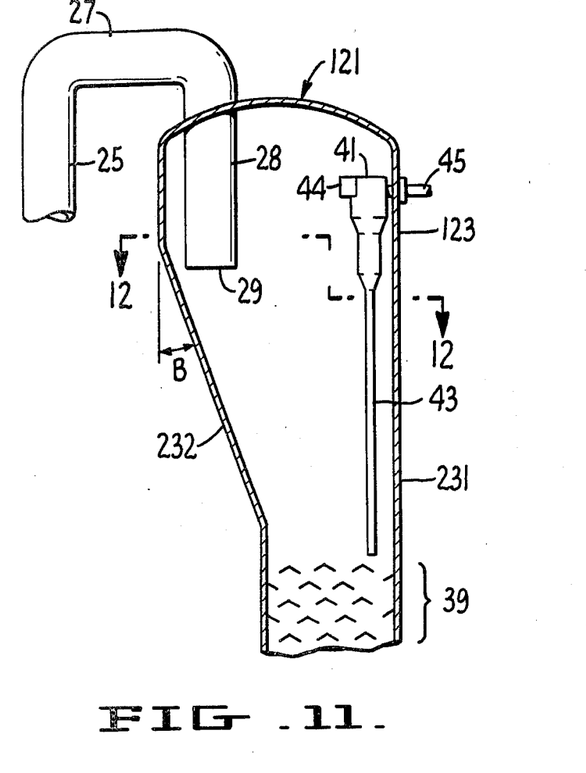
FIG. 11 is a schematic, partial cross-sectional elevation view of a still further embodiment of the invention similar to the FIG. 9 embodiment wherein discharge of the external riser is against an angled side wall.
Figure 12:
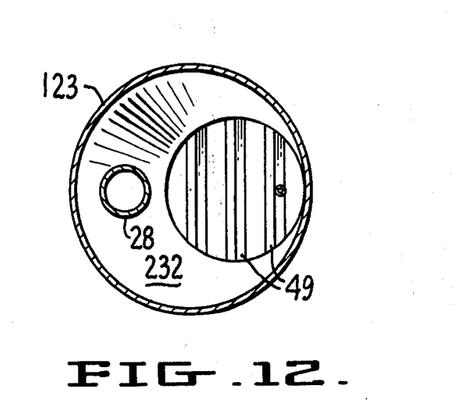
FIG. 12 is a partial cross-sectional plan view of the FIG. 11 embodiment of the invention taken in direction of arrows 12—12 in FIG. 11.
Figure 13:
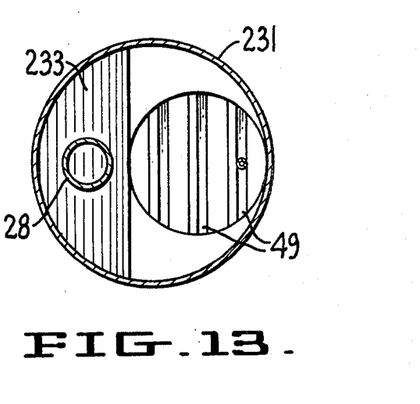
FIG. 13 is a partial cross-sectional plan view, similar to FIG. 12, illustrating the use of an angled plate member within a reactor vessel for deflecting discharge from an external riser pipe.

In the FIGS. 11 to 13 embodiments, reactor vessel 121 includes an upper cylindrical section 123 whose vertical axis is not coextensive with the axis of the cylindrical section enclosing catalyst stripping section 39. A transition section 232 may either take a quasi-conical form, as indicated in FIG. 12, or be a substantially flat plate 233 as in FIG. 13. In either case the hydrocarbon-catalyst mixture discharges from riser opening 29 so that it impinges against a surface that is disposed at an obtuse angle B relative to the direction of flow from riser section 28.

As will be apparent from the description of the preferred embodiments of the invention, as discussed in connection with FIGS. 1, 2 and 4 to 8, inclusive, additional wall baffles such as 40 or central conical baffle 51 may be used with catalyst disengaging baffle 61 (FIG. 9) or 232 (FIG. 11). Such additional baffles would augment the catalyst and hydrocarbon vapor separation functions of the primary baffles in the reactors shown in FIGS. 9 to 13.

In operation of the cracker unit of the present invention, as in FIGS. 1, and 2, an input feed of a mixture of oil and catalyst is supplied to a zone within the riser conduit 25 wherein catalytic cracking occurs. The resulting mixture is conveyed, possibly with additional transport steam, upwardly within the riser conduit 25. The mixture is then deflected laterally through a right angle turn, preferably with assistance of turning vane 24, into horizontal section 26 and then downwardly by another right angle turn, preferably with assistance of turning vane means 30, into discharge section 28 for discharge through outlet end 29. After leaving outlet 29 the hydrocarbon vapor/catalyst mixture is then deflected by the catalyst disengaging conical baffle 51 toward the outer periphery of the shell 23. In the preferred embodiment, catalyst and reactants are in turn deflected again by the annular catalyst disengaging wall baffle 61 thereby providing the partial cyclone separating zone between the baffles. A large quantity of reaction product, e.g., converted hydrocarbon is removed or disengaged from the catatlyst in this zone by the inertial effects of cyclone-type separation. The catalyst particles with small remaining quantities of hydrocarbon associated therewith are diverted, e.g., continue to fall by gravity and inertia, into the stripping zone 39 (including stripping zone 48 of FIG. 1) where additional quantities of hydrocarbons are removed from the particles by the stripping steam from nozzles 36 supplied from manifold 35.

FIG. 3 is a diagrram of modeling studies indicating the criticality of using at least conical baffle 51 to promote disengagement of catalyst and reactant hydrocarbons. Additionally, it illustrates the criticality of catalyst circulation rates versus catalyst loss rate as a function of outlet velocity of the catalyst/hydrocarbon mixture from riser 25, as measured at discharge end 29. As shown there, Curve A indicates operation of a downwardly discharge of the mixture without conical baffle 51. The loss of catalyst for any given catalyst circulation rate far exceeds the loss from any flow rate of Curve B, C or D illustrating the beneficial effect of baffle 51 on minimizing catalyst losses and improving the separation of hydrocarbon vapors from spent catalyst. Curve B was measured at flow rate equivalent to 21 ft./sec., Curve C at 60 ft./sec. and Curve D at 120 ft./sec. The reason for the lower loss of catalyst at double the flow rate, as between Curves C and D is believed to be due to the criticality of the cyclonic separation of catalyst from the reactant mixture produced by the combined catalyst disengaging actions of conical baffle 51 and wall baffle 61 to induce action for the catalyst indicated by arrows 63 in FIG. 2. However, for whatever reason, FIG. 3 illustrates the clear advantage of using catalyst disengaging baffles in the reaction vessel for an external riser discharging downwardly into such vessel.

The hydrocarbon vapors and small particles of catalyst, mostly fines, are convected to the cyclone separators 41 at the top of vessel 21 from which the separated catalyst is delivered via diplegs 43 to the catalyst dense phase within vessel 21. The hydrocarbon products, steam, and unseparated catalyst are removed from the unit by way of line 45.

The input feed stocks for fluidized catalytic cracking in accordance with the present invention may vary widely. The hydrocarbon feedstocks may include virgin petroleum distillates, residual petroleum fractions, deasphalted oils, hydrofined hydrocarbon oils synthetic crude oils of coal or shale and mixtures thereof. Heavy petroleum hydrocarbon fractions (e.g., boiling points of 600° F. and higher) may be advantageously converted to lower boiling, more valuable hydrocarbon products such as motor gasoline components boiling in the range of from about 100° F. to about 450° F., or diesel fuel boiling in the range of about 450° F. to about 650° F., etc.

A wide variety of catalysts may be used. Typical catalysts include the combination of amorphous materials together with crystalline materials, such as molecular sieves. The predominate components of cracking catalysts are silica and alumina in ratios of from about 10 to about 60% alumina in silica. Trace combinations of other metals such as platinum and rare earths may also be present. Silica-magnesia and other mixed oxide catalysts may also be used.

The catalyst employed may include particles having a wide range of free settling rates. Commercially available powdered cracking catalysts having a particle size distribution with 60 to 90 weight percent in the 20 to 120 micron range may be used.

The range of catalyst/oil feed weight ratios and selection of a preferred ratio are dependent upon various factors affecting the cyclic system, including heat balance considerations as known to those skilled in the art, and these considerations in turn determine the temperature of the catalyst and oil at the entrance to the cracking zone. Cracking in the riser conduit is initiated when hot catalyst is mixed with the hydrocarbon feedstock.

A wide range of catalyst/oil feed weight ratios may be used, and preferably catalyst/oil feed weight ratios of from about 2 to 1 to about 20 to 1 may be used, together with a range of hydrocarbon/catalyst contact times from about ½ to about 5 seconds. The veocity of vapors exiting the discharge area or zone 29 may be maintained so that the gas flow rate is 10 to 60, preferably about 30 ft./sec. As discussed hereinabove, enough gas velocity is needed to generate a cyclone pattern off of the catalyst disengaging riser baffle, but not such a high velocity as will blow excessive catalyst up into the dilute phase, it being understood that the hydrocarbon vapor/catalyst mixture exits from the riser with sufficient inertia for all of the catalyst to slide down the conical catalyst disengaging baffle but with insufficient inertia for most of the catalyst to rise completely up the wall catalyst disengaging baffle. The separated catalyst then falls into the stripping zone. Other reaction conditiions including temperature will be readily selected by one skilled in the art of fluidized catalytic cracking.

As used in the description of the preferred method and apparatus embodiments of this invention, the terms referring to the center or central zone of the reactor vessel refer primarily to the position of the catalyst discharge outlet 29 along the axis of the vessel rather than the transverse or lateral distance from a sidewall. It will be apparent to those skilled in the art that the vertical spacing between the catalyst disengaging section and the hydrocarbon vapor separation section is important rather than the lateral position of the riser pipe outlet and the catalyst disengaging baffle. In fact such lateral position for the catalyst hydrocarbon mixture may be near the vessel wall without loss of the advantages of this invention.

The principles, preferred embodiments and modes of operation of the present invention have been described in the forgoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the following claims be embraced thereby.

What is claimed is:

1. A fluidized catalytic reaction apparatus comprising:
   (a) means for conveying an input feed of a catalytic reaction mixture of hydrocarbonaceous material and catalyst particles upwardly in a riser conduit arranged externally to a reactor vessel generally vertically co-extensive with the upper portion of the riser conduit;
   (b) said riser conduit having a horizontal portion traversing an upper wall of said vessel and a discharge outlet on a downflow portion of said conduit disposed in substantially the center of said vessel for downward discharge of said reaction mixture;
   (c) means for deflecting the downwardly moving catalytic reaction mixture at an angle with respect to said discharge outlet of said riser conduit, said deflecting means being adjacent to and below said discharge outlet for directing said mixture toward an inner wall of said vessel to initiate disengagement of catalyst from the reaction products;
   (d) means for directing disengaged catalyst to a stripping zone arranged in a lower portion of said vessel; and
   (e) means for recovering reaction products separated from catalyst in an upper portion of said vessel.

2. The apparatus of claim 1 wherein said deflecting means is preferably conical in form and the apex of said conical form is substantially coaxial with said discharge outlet.

3. The apparatus of claim 2, further comprising means for additionally deflecting the reaction mixture, now mostly catalyst, generally from said inner wall of said vessel toward the center of said vessel and said stripping zone.

4. The apparatus of claim 2, further comprising means for establishing a partial cyclone separating zone in said vessel generally below the discharge outlet and above the stripping zone.

5. A reactor vessel for a fluidized catalytic cracking unit comprising:
   an outer generally cylindrical shell forming a side wall of the reactor vessel and having a stripping zone arranged below said shell and at a lower end of said vessel;
   a riser conduit extending generally vertically parallel to said shell from the lower end of said vessel to a location axially spaced from and near top of said vessel;
   means forming a right angle turn of said riser conduit to form a horizontal portion thereof, said horizontal portion passing through said cylindrical shell and extending to substantially the center of said shell at said spaced location, and means forming another right angle turn of said riser conduit to place the discharge outlet from said conduit below said location;

means for conveying a mixture of hydrocarbons and catalyst through said riser conduit for discharge of said mixture of the resulting hydrocarbon products and catalyst downwardly into said shell from said conduit outlet; and a catalyst disengaging baffle having a surface at an obtuse angle relative to the flow axis of said conduit outlet, said surface being at an elevation directly below said discharge outlet and above the stripping zone to deflect said mixture discharged from said outlet downwardly and toward a wall of said vessel.

6. The reactor vessel of claim 5 wherein said catalyst disengaging baffle surface is preferably conical and the apex of such conical baffle is substantially coaxial with said conduit outlet.

7. The reactor vessel of claim 6, wherein said conical baffle is arranged at an angle of 10° to 30° with respect to vertical.

8. The reactor vessel of claim 6, wherein said conical baffle is preferably arranged at an angle of 20° with respect to vertical.

9. The reactor vessel of claim 6 or 7, wherein the ratio of the radius of the lower end of said conical baffle to the radius of said riser conduit at said discharge outlet is more than one and less than ten.

10. The reactor vessel of claim 6, wherein the lower end of said catalyst disengaging conical baffle is located as high as possible in said reactor vessel to extend said stripping zone to its highest useful level in said reactor vessel.

11. The reactor vessel of claim 5, further comprising an annular catalyst disengaging wall baffle arranged on the inside of said reactor vessel for additional deflection of said mixture, mostly catalyst.

12. The reactor vessel of claim 11, wherein the wall baffle is arranged at an angle of from about 10° to about 30° with respect to the wall of such reactor vessel.

13. The reactor vessel of claim 11, wherein said wall baffle is arranged preferably at an angle of approximately 20° with respect to the wall of said reactor vessel.

14. The reactor vessel of claim 11, wherein said additional baffle means are arranged at an angle of 10° to about 30° with respect to vertical above said baffle and below the hydrocarbon vapor-catalyst cyclone separation means intake.

15. The reactor vessel of claim 11, wherein said conical baffle and said wall baffle are arranged within said shell such that said baffles act in concert with said discharge outlet from said riser to form a partial cyclone separating zone between said baffles.

16. The reactor vessel of claim 15, wherein the cross-sectional area of an opening formed between a lower end of said conical baffle and said wall baffle is approximately the same as the cross-sectional area of any portion of the downstream stripping zone lower in said vessel.

17. In a fluidized catalytic cracking system for the conversion of a hydrocarbon feedstock to lower boiling fractions, and having a generally cylindrical external shell forming a reactor vessel and a reactor riser conduit, external and parallel to said vessel, said riser conduit entering said vessel in a generally U-turn to form a downward discharge outlet from said riser conduit into said vessel, and a catalyst stripping zone in the lower portion of said vessel, the improvement for separating comprising converted hydrocarbon vapors from the catalyst in combination:

a preferably conical catalyst disengaging baffle coaxial with and having its apex directed upwardly below said discharge outlet for deflecting said mixture outwardly from said outlet, said baffle being at an angle of about 10° to 30°, with respect to vertical;

an annular catalyst disengaging wall baffle on the inside of said shell for deflecting the hydrocarbon vapor-catalyst mixture, said baffle being at an angle of about 10° to 30°, with respect to said shell wall, said catalyst disengaging baffle and said wall baffle positioned with respect to each other so as to form complementing conical surfaces and adapted to act in tandem with said discharge outlet to form a partial cyclone separating zone whereby the efficiency of the catalyst from hydrocarbon vapor separation is increased;

the ratio of the radial distances between the lower end of said catalyst disenngaging baffle and the outlet of said riser conduit being more than 1 and less than 10; and the annular opening between the lower end of said catalyst disengaging baffle and said wall baffle has a cross-sectional area approximately the same as in any lower portion of said stripper zone.

18. A process for separating hydrocarbon reaction products from catalyst in a fluidized catalytic reaction system comprising the steps of:
(a) conveying an input feed of a fluidized catalytic reaction mixture upwardly within a riser reaction conduit zone arranged generally parallel and external to a separation vessel;
(b) deflecting the catalytic reaction mixture first horizontally and then downwardly and constraining the resulting mixture of hydrocarbon vapor and catalyst to discharge downwardly into an outlet zone in the central portion of said vessel above the upper level of the dense phase of catalyst;
(c) deflecting said downwardly moving mixture above said dense phase outwardly from said outlet zone toward the wall of said vessel to promote early disengagement of catalyst from hydrocarbon vapor;
(d) directing disengaged catalyst to a stripping zone arranged in a lower portion of said vessel; and
(e) recovering hydrocarbon vapors separated from catalyst in an upper portion of said vessel.

19. The process of claim 18, further comprising the step of, subsequent to step (c) and prior to step (d) further deflecting said mixture, now mostly catalyst, near the inner wall of said vessel downwardly toward said stripping zone.

20. The process of claim 19, further comprising establishing a partial cyclone separating zone in said vessel by further deflections of the mixture generally below said outlet zone and above the stripping zone.

21. A process for separating hydrocarbon conversion products from a mixture of a fluidized catalyst particles and hydrocarbonaceous matter in a fluid catalytic cracking unit, comprising the steps of:
conveying an input feed of a mixture of hydrocarbon and catalyst within a riser conduit arranged generally upwardly externally and along side of a generally cylindrical vessel;

diverting the resulting mixture of hydrocarbon vapors and catalyst over a 180° turning radius and constraining said mixture to discharge downwardly into said vessel above an upper level of the dense phase of catalyst;

deflecting said downwardly discharged mixture outwardly toward the cylindrical wall of said vessel above the dense phase with a preferably conical surface to disengage catalyst from said mixture below said riser conduit discharge; and flowing the catalyst by inertia and gravity into a stripping zone arranged at the lower end of the vessel.

22. The process of claim 21, further comprising limiting the height of the dense phase of catalyst within said vessel to a level below a lower edge of said conical surface.

* * * * *

UNITED STATES PATENT AND TRADEMARK OFFICE
CERTIFICATE OF CORRECTION

PATENT NO. : 4,414,100

DATED : November 8, 1983

INVENTOR(S) : Krug et al

It is certified that error appears in the above—identified patent and that said Letters Patent is hereby corrected as shown below:

```
Col.  1, line 15, "ctalytic" should be --catalytic--.
Col.  1, line 16, "see" should be --See--.
Col.  2, line  5, "withi" should be --within--.
Col.  2, line  9, "other" should be --others--.
Col.  2, line 11, delete ".".
Col.  2, line 32, "cacker" should be --cracker--.
Col.  2, line 40, "hydroarbons" should be --hydrocarbons--.
Col.  3, line  7, "contat" should be --contact--.
Col.  3, line 14, "10° 30°" should be --10° to 30°--.
Col.  4, line 11, "pocked" should be --pocket--.
Col.  4, line 13, "cartalyst" should be --catalyst--.
Col.  4, line 19, "auxiliary" should be --auxiliary--.
Col.  5, line 67, "ractor" shoud be --reactor--.
Col.  7, line 18, "arangement" should be --arrangement--.
Col.  7, line 34, "nmay" should be --may--.
Col. 10, line 30, "catatlyst" should be --catalyst--.
Col. 10, line 39, "diagrram" should be --diagram--.
Col. 11, line 44, "veocity" should be --velocity--.
Col. 11, line 58, "iions" should be --ions--.
Col. 14, line 24, "disenngaging" should be --disengaging--.
```

Signed and Sealed this

Seventh Day of February 1984

[SEAL]

Attest:

GERALD J. MOSSINGHOFF

Attesting Officer

Commissioner of Patents and Trademarks